US010274112B2

(12) United States Patent
Lane

(10) Patent No.: US 10,274,112 B2
(45) Date of Patent: *Apr. 30, 2019

(54) THREADED CONNECTION

(71) Applicant: Bryan Lane, Houston, TX (US)

(72) Inventor: Bryan Lane, Houston, TX (US)

(*) Notice: Subject to any disclaimer, the term of this patent is extended or adjusted under 35 U.S.C. 154(b) by 37 days.

This patent is subject to a terminal disclaimer.

(21) Appl. No.: 15/667,971

(22) Filed: Aug. 3, 2017

(65) Prior Publication Data
US 2018/0051835 A1 Feb. 22, 2018

Related U.S. Application Data

(63) Continuation-in-part of application No. 15/438,548, filed on Feb. 21, 2017, which is a continuation-in-part of application No. 14/286,864, filed on May 23, 2014, now Pat. No. 9,644,771.

(60) Provisional application No. 61/832,098, filed on Jun. 6, 2013.

(51) Int. Cl.
F16L 15/08 (2006.01)
F16L 15/00 (2006.01)
E21B 17/042 (2006.01)
F16L 58/04 (2006.01)
E21B 17/08 (2006.01)
F16L 15/06 (2006.01)

(52) U.S. Cl.
CPC .......... F16L 15/002 (2013.01); E21B 17/042 (2013.01); E21B 17/08 (2013.01); F16L 58/04 (2013.01); F16L 15/004 (2013.01); F16L 15/06 (2013.01)

(58) Field of Classification Search
CPC ....... E21B 17/042; F16L 15/002; F16L 15/08; F16L 15/06
See application file for complete search history.

(56) References Cited

U.S. PATENT DOCUMENTS

| 1,889,870 | A | 12/1932 | Montgomery |
| 2,781,206 | A | 2/1957 | Ragland |
| 4,917,409 | A | 4/1990 | Reeves |
| 5,971,443 | A | 10/1999 | Noel |
| 6,312,024 | B1 | 11/2001 | Dutilleul |
| 6,406,070 | B1 | 6/2002 | Delange |
| 6,811,189 | B1 | 11/2004 | Delange |
| 9,644,771 | B1* | 5/2017 | Lane ..................... E21B 17/042 |
| 2002/0011778 | A1 | 1/2002 | Krug |
| 2002/0158469 | A1 | 10/2002 | Mannella |

(Continued)

Primary Examiner — David Bochna
(74) Attorney, Agent, or Firm — Buskop Law Group, P.C.; Wendy Buskop

(57) ABSTRACT

An improved threaded connection for joining tubulars for oil and gas field operations forms connected tubular strings. The improved threaded connection includes a one piece coupling comprising a body with an outer surface an inner surface and a central axis, a first tapered edge, a second tapered edge, first and second bearing faces for supporting load, weight, or both of the connected tubulars, a plurality of torque stops, and radial metal to metal seal surfaces. As the inner surface of the body is swaged onto each tubular, the inner surface of the body deflects away from the central axis, providing a plurality of bands of high contact pressure at each metal to metal seal between the inner surface of the body and each connected tubular to sustain seal pressures at the threaded one piece coupling.

19 Claims, 8 Drawing Sheets

(56) References Cited

U.S. PATENT DOCUMENTS

| | | |
|---|---|---|
| 2004/0113423 A1 | 6/2004 | Dell'Erba |
| 2006/0152000 A1 | 7/2006 | DeLange |
| 2009/0250927 A1 | 10/2009 | Pallini |
| 2011/0025052 A1 | 2/2011 | Goto |
| 2012/0074692 A1 | 3/2012 | Chelette |

* cited by examiner

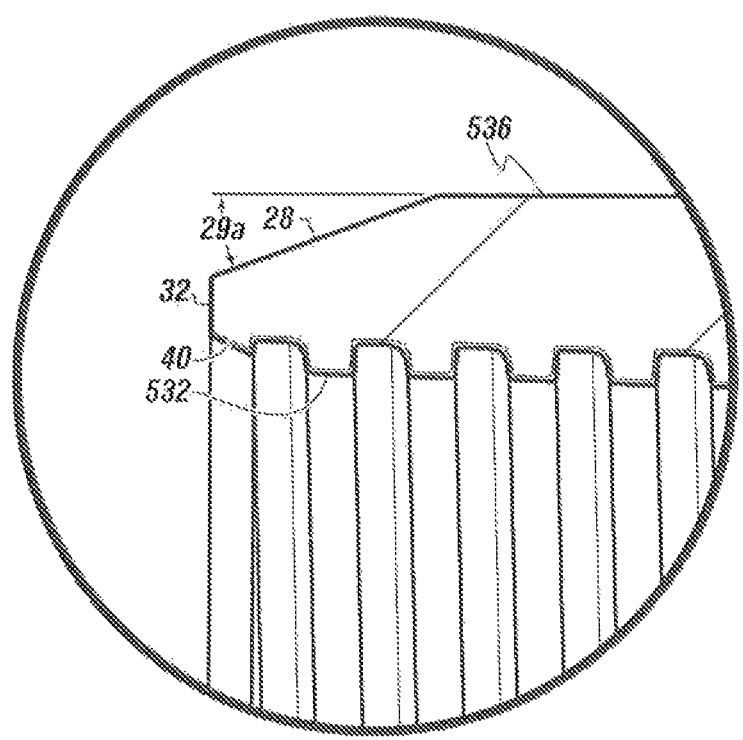
FIGURE 1C
FIGURE 1D
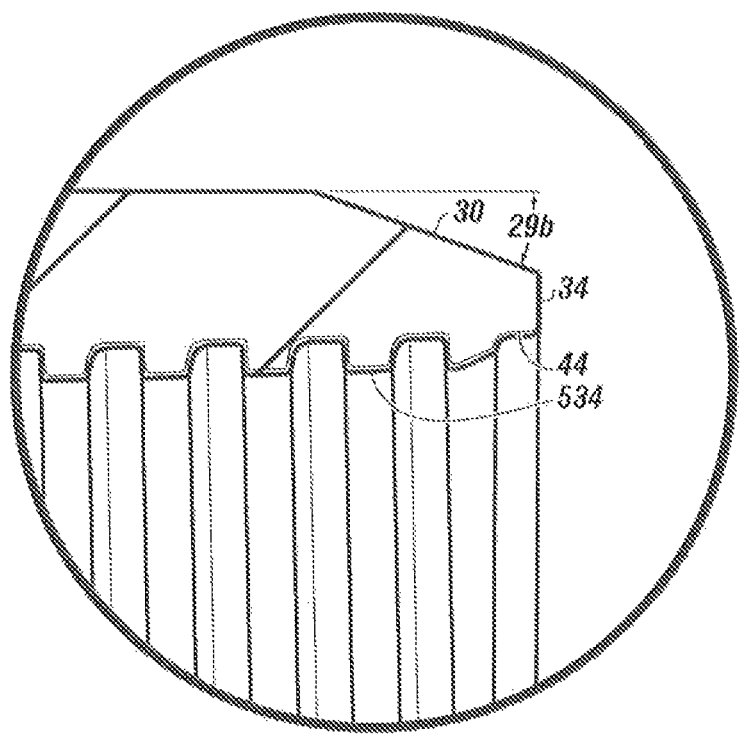

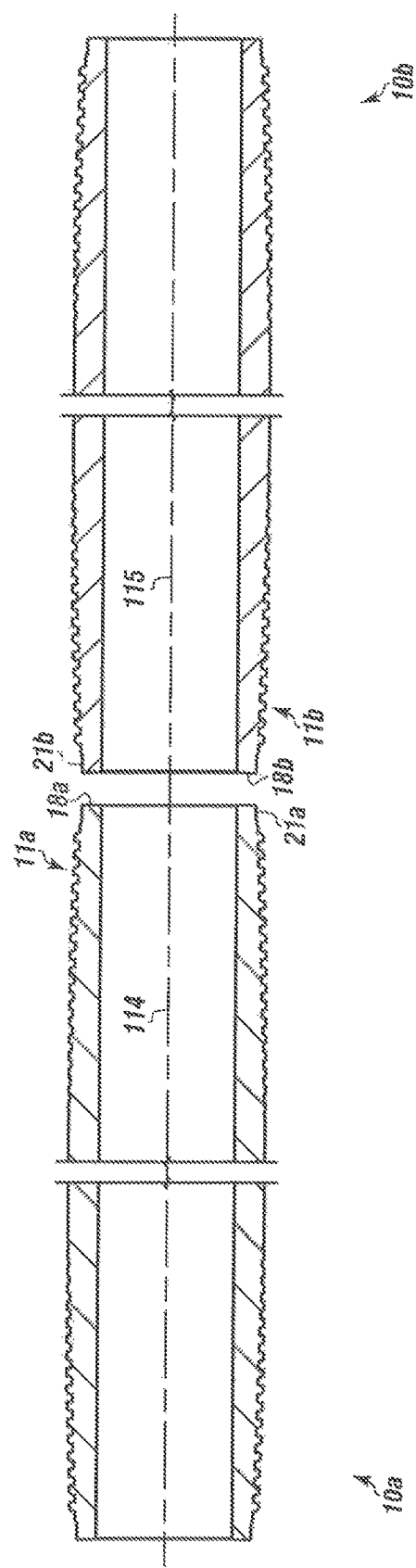

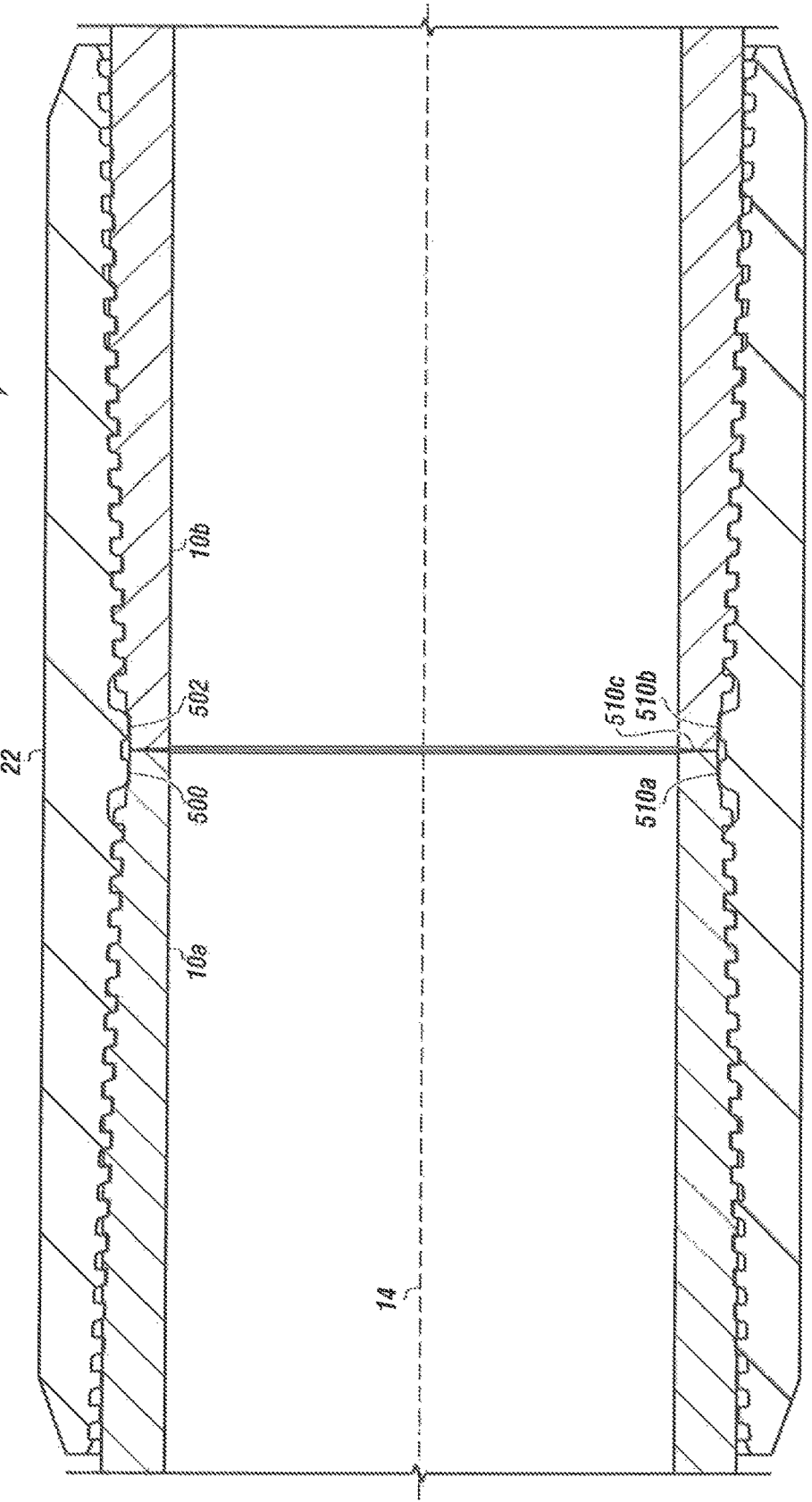

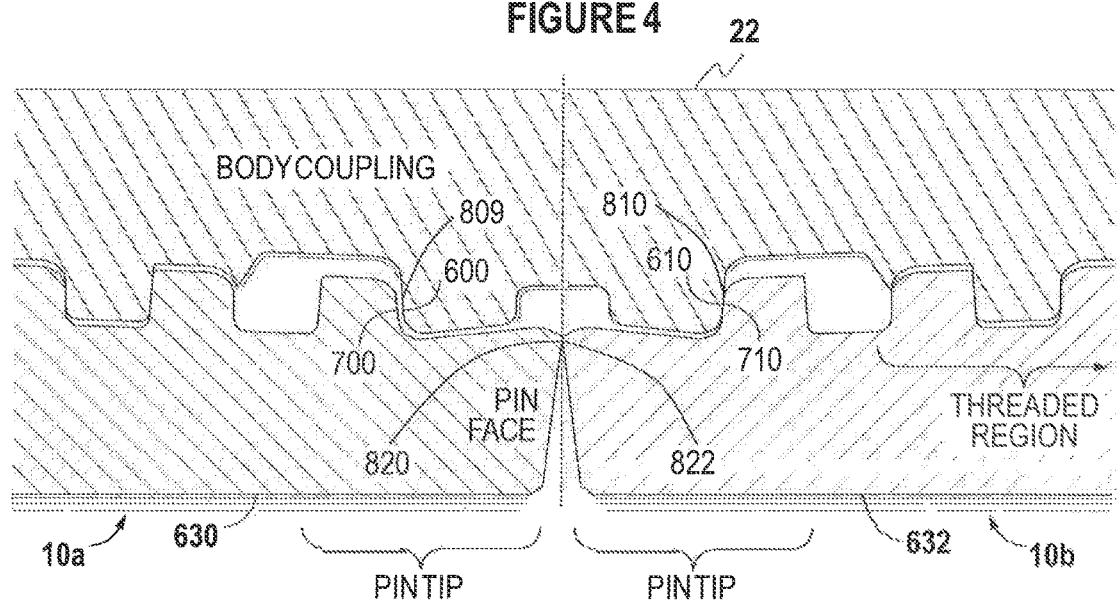

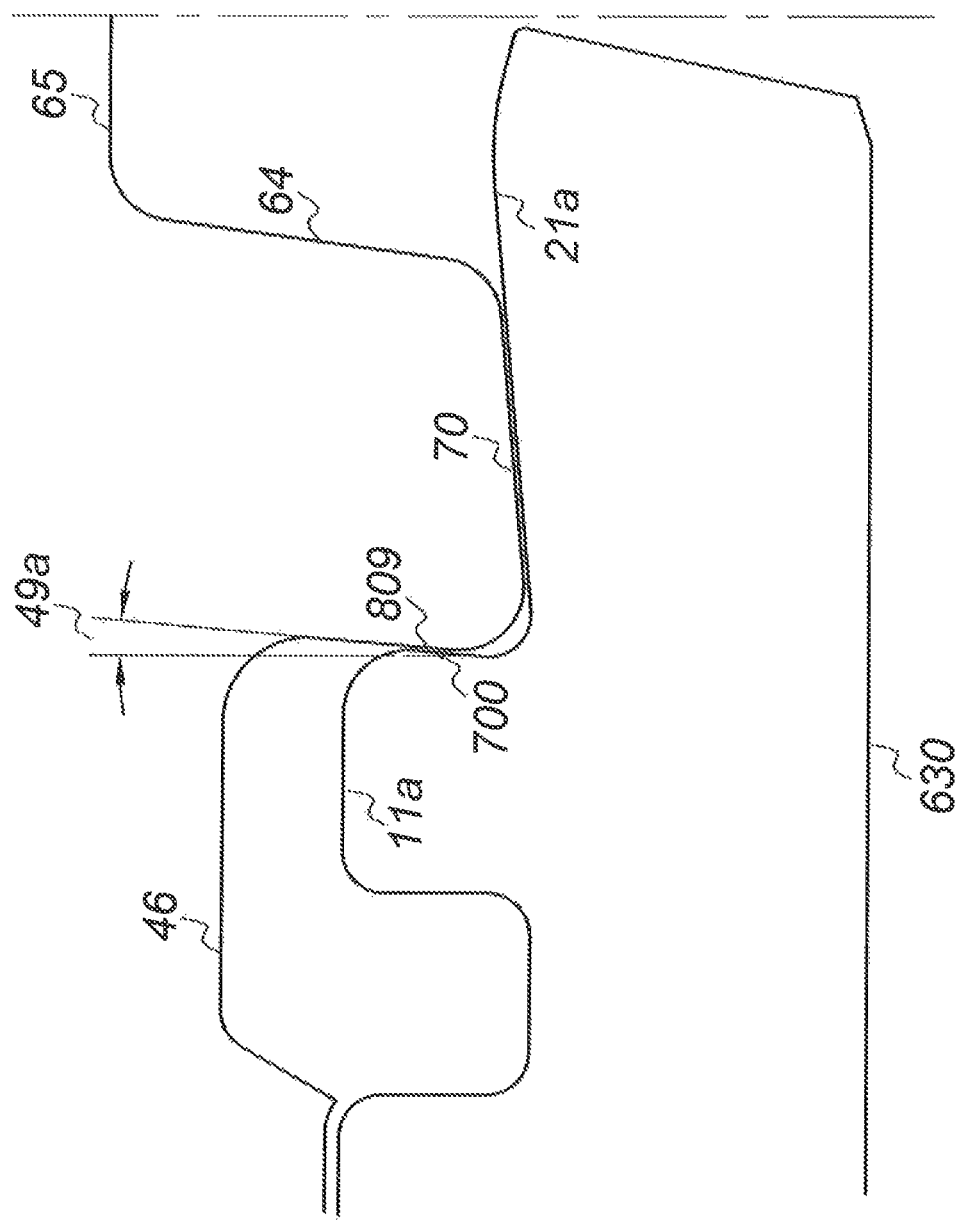

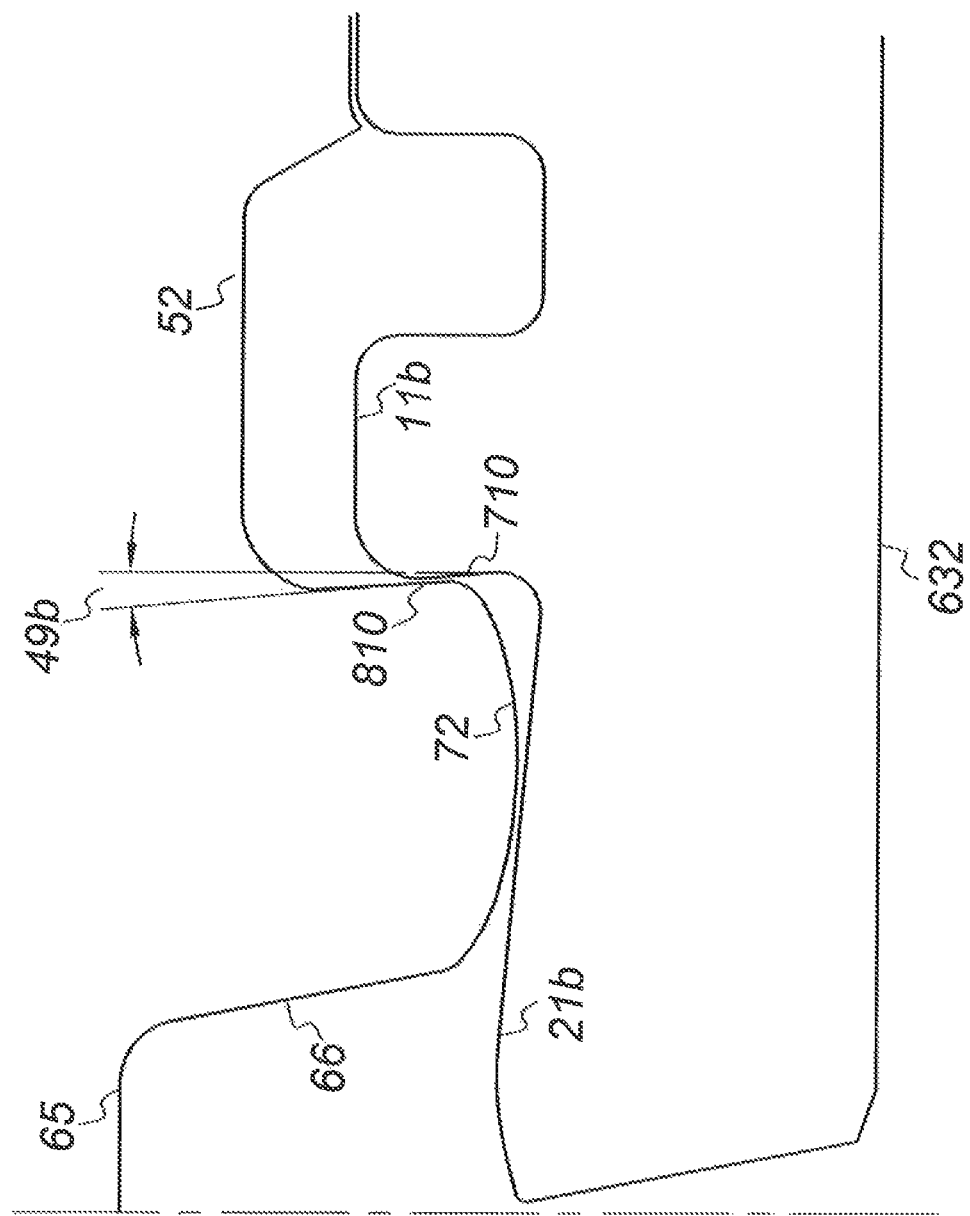

THREADED CONNECTION

CROSS REFERENCE TO RELATED APPLICATIONS

The present application is a Continuation in Part of co-pending U.S. patent application Ser. No. 15/438,548 filed on Feb. 21, 2017, entitled "THREADED CONNECTION", which is a Continuation in Part of U.S. patent application Ser. No. 14/286,864 filed on May 23, 2014, which issued as U.S. Pat. No. 9,644,771 on May 9, 2017, which claims priority to and the benefit of U.S. Provisional Patent Application Ser. No. 61/832,098 filed on Jun. 6, 2013, entitled "CONNECTION" and U.S. patent application Ser. No. 14/286,864 filed May 23, 2014. Both references are hereby incorporated in its entirety.

FIELD

The present embodiments generally relate to an improved threaded connection with a one piece coupling that forms a connection between pin ends of pairs of tubulars by providing two torque stops, two radial metal to metal seals, and an axial metal to metal seal between pin faces of the pair of tubulars that sustain pressures equivalent to pipe burst limits without deforming.

BACKGROUND

A need exists for an inexpensive to manufacture load transferring improved threaded connection that provides a rotational stop for torque based assembly of two tubulars joined by a one piece coupling that includes metal to metal seals and that provides pressure capacity equal to the burst of the tubular.

A further need exists for an improved threaded connection with a one piece coupling that provides the highest torque capacity, remains low cost, and the threaded one piece coupling should require no additional parts to seal high pressure fluids.

The present embodiments meet these needs.

BRIEF DESCRIPTION OF THE DRAWINGS

The detailed description will be better understood in conjunction with the accompanying drawings as follows:

FIG. 1C depicts a detailed view of a first end of the threaded one piece coupling of FIG. 1A.

FIG. 1D depicts a detailed view of a second end of the threaded one piece coupling of FIG. 1A.

FIG. 2 depicts a cutaway view of two tubulars usable to form the improved threaded connection.

FIG. 3 is a cutaway view of the two pin ends of the two tubulars joined by the threaded one piece coupling.

FIG. 4 is detailed view of the two pin ends of the two tubulars joined by the threaded one piece coupling according to one or more embodiments.

FIG. 5 presents a detailed view of the metal seal region of the threaded one piece coupling according to one or more embodiments.

FIG. 6 presents a detailed view of the metal seal region of the threaded one piece coupling according to one or more embodiments.

Figure 1A:
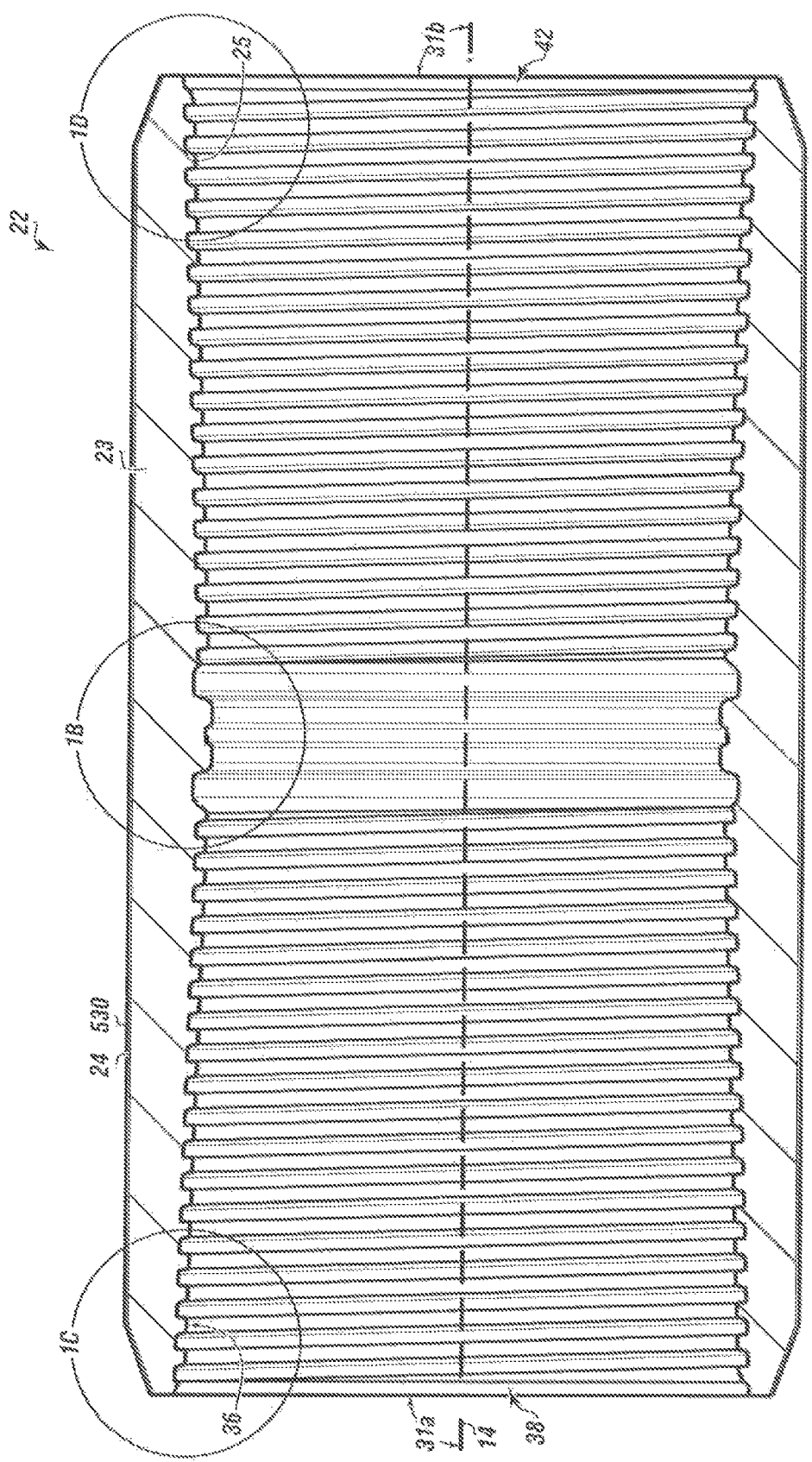
FIG. 1A depicts a cutaway view of the threaded one piece coupling.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a threaded one piece coupling for pairs of threaded tubulars for oil and gas field applications.

The invention relates to an improved threaded connection of a first tubular with a second tubular.

The improved threaded connection is made from a first tubular with a first pin.

The first pin has a first axial mating pin face, a first axial metal seal surface on the first axial mating pin face; first radial metal seal surface adjacent to the first axial mating pin face a first pin minimal radial shoulder adjacent the first radial metal seal surface; the first pin minimal radial shoulder extending an angle 75 degrees to 105 degrees from a first tubular central axis of the first tubular.

The first pin has a first tubular threaded region formed adjacent to the first pin minimal radial shoulder for forming a first threaded engagement.

The improved threaded connection has a second tubular with a second pin.

The second pin has a second axial mating pin face; a second axial metal seal surface on the second axial mating pin face; a second radial metal seal surface adjacent to the second axial mating pin face; a second pin minimal radial shoulder adjacent the second radial metal seal surface; the second pin minimal radial shoulder extending an angle 75 degrees to 105 degrees from a second tubular central axis of the second tubular; and a second tubular threaded region formed adjacent the second pin minimal radial shoulder for forming a second threaded engagement.

Besides the two pins of two tubulars, the improved threaded connection has a one piece coupling for mating the first pin of the first tubular with the second pin of the second tubular.

The threaded one piece coupling has an outer surface, an inner surface and a central axis.

The threaded one piece coupling outer surface has: a first tapered edge extending from the outer surface; a second tapered edge extending from the outer surface opposite the first tapered edge; a first coupling bearing face formed on the first tapered edge for supporting load, weight, or both load and weight and weight of the connected tubulars; a second coupling bearing face formed on the second tapered edge for supporting load, weight, or both load and weight and weight of the connected tubulars.

The threaded one piece coupling has an inner surface with a first threaded region with a first threaded relief groove having a first metal seal surface which has a continuous curvature of a radius or a radius that is flat for forming a first metal to metal seal when the first tubular threaded region engages the first threaded region.

The threaded one piece coupling has an inner surface with a first threaded relief groove first flank extending at a first threaded relief groove first flank angle relative to the central axis, a first threaded relief groove second flank extending at a first threaded relief groove second flank angle such as between 75 degrees and 105 degrees relative to the central axis forming a first torque stop between the first metal seal surface and the first threaded relief groove.

The threaded one piece coupling has an inner surface with a second threaded region with a second threaded relief groove having a second metal seal surface with a continuous curvature of a radius or a flat radius for forming a second metal to metal seal when the second tubular threaded region engages the first threaded region.

The second threaded region has a second threaded relief groove first flank extending at a second threaded relief groove first flank angle relative to the central axis.

The second threaded region has a second threaded relief groove second flank extending at a second threaded relief groove second flank angle such as between 75 degrees and 105 degrees relative to the central axis forming a second torque stop between the second metal seal surface and the second threaded relief groove.

A deflection relief groove is positioned between the first metal seal surface and the second metal seal surface with the first axial metal seal surface engaging the second axial metal seal surface.

The threaded one piece coupling is configured to either (i) provide the first torque stop using the first tubular while simultaneously providing an axial metal seal between connected pin faces of the first and second tubulars without forming a second torque stop with the second tubular, or (ii) provide the second torque stop using the second tubular while simultaneously providing an axial metal seal between connected pin faces of the first and second tubulars without forming the first torque stop with the first tubular; and the inner surface of the threaded one piece coupling deflects away from the central axis, providing a plurality of radial bands of high contact pressure for each connected tubular and an axial band of high contact pressure to sustain seal pressures between the threaded one piece coupling and each tubular that are equivalent to or greater than the burst pressures of each tubular.

The following terms are used herein:

The term "alloy of copper" can refer to any alloy that includes the element copper that can be used to plate the surfaces of the threaded one piece coupling. Plating of the threads is completed to inhibit metal transfer known as galling.

The term "alloy of tin" can refers to any alloy that includes the element tin that can be used to plate the surfaces of a threaded one piece coupling. Plating of the threads of the threaded one piece coupling can inhibit metal transfer known as galling.

The term "alloy of zinc" can refers to any alloy that includes the element zinc that can be used to plate the surfaces of the threaded one piece coupling.

The term "anti-corrosion" can refer to a type of coating to prohibit corrosion of the metal materials used for the tubulars and the threaded one piece coupling which are applied to the materials or plating onto the materials to deposit a metallic layer that prevents corrosion.

The term "applied torque" can refer to applying to an assembly of tubulars or a single make-up of a tubular engaging the threaded one piece coupling or applied to the threaded one piece coupling, torque or load by simply holding the threaded one piece coupling and rotating each tubular into the threaded one piece coupling by applying torque to the tubular.

The term "asymmetrical tapered edge" can refer to tapered edges of the threaded one piece coupling that differ in taper angles such that the outer diameter of the taper at the base or lower end of a taper differs from an adjacent taper.

The term "bands of high contact pressure" can refer to contact pressure developed at metal to metal seals due to radial or axial interference developed between the threaded one piece coupling and the tubulars. The bands of high contact pressure are usually short in axial length and can easily exceed the tensile yield strength of the metals in contact.

The term "body" can refer to the main or largest component in the threaded one piece coupling.

The term "cathodic protection" can refer to applying a coating or attaching an object to the threaded one piece coupling to protect it from corrosion by making the threaded one piece coupling into a cathode; and the coating or object into an anode. The object can be a zinc fish or a zinc based coating.

The term "central axis" can refer to the center of the body defined at the radial dimension of zero.

The term "coated" can refer to a covering applied to the threaded one piece coupling outer or inner surface to prohibit corrosion or reduce the required torque during make-up.

The term "connected tubulars" can refer to two tubulars made-up into an threaded one piece coupling.

The term "central deflection relief groove" can refer to a groove formed in one part of the threaded one piece coupling to allow the tubulars of the improved threaded connection to deflect into the space provided by the central deflection relief groove to avoid or influence the type contact that occurs between two parts being joined by the threaded one piece coupling.

The term "encapsulated" can refer to the threaded one piece coupling being coated on all surfaces; typically to inhibit corrosion.

The term "flank" can refer to the angled surface on either side of a relief groove or on either side of a thread form on the threaded one piece coupling.

The term "groove" can refer to thread reliefs, deflection reliefs, and thread form grooves machined along the threaded region of the threaded one piece coupling.

The term "inner surface" of the body can refer to an innermost radial surface of the body, which in embodiments can be a cylindrical shaped body.

The term "lead in taper" can refer to the conical openings at both ends of the threaded one piece coupling. A lead in taper allows the tubular end to be stabbed into the threaded one piece coupling during the make-up procedure.

The term "lubricating powder" can refer to a dry granular solid such as graphite or molydisulphide that reduces the friction at the interring metal surfaces in contact while using the threaded one piece coupling.

The term "metal to metal seal" can refer to joined metal to metal seal surfaces of the pin faces or the radial seal surface formed using the threaded one piece coupling with the tubulars, to seal high pressure fluids. The metal to metal seal can be a radial metal seal or axial metal seal.

The term "metal to metal seal surface" can refer to a length along the inner surface of the threaded one piece coupling where radial contact is intended to form a metal seal with the tubular end. The two tubular ends form an axial metal to metal seal surface. The pin ends of the tubulars each have a metal to metal seal surface on each pin face, which form a metal to metal seal when the threaded one piece coupling joins the pins.

The term "oil and gas field" can refer to an area where oil and gas wells have been or are in the process of being drilled and are or will be producing hydrocarbons from subsurface formations.

The term "one piece coupling bearing face" can refer to the surface at the end of the inventive threaded one piece coupling that has an annular surface and is perpendicular to the central axis. The threaded one piece coupling bearing face can have an outer diameter at the base of the tapered edge and an inner diameter at the start of the lead in taper.

The term "outer surface" can refer to the outermost radial surface of the body.

The term "phosphate coating" can refer to a layer of insoluble crystalline phosphates applied using a spray or immersion process to resist corrosion on steel parts of the threaded one piece coupling.

The term "pin" can refer to the length at the end of a tubular where the threaded region and the metal seal surfaces are machined.

The term "pin face" can refer to an axial surface of each pin which is perpendicular or near perpendicular to the central axis of the tubular after machining processes have formed the threaded regions and metal seal surfaces.

The term "pipe string" can refer to a series of tubulars connected using threaded one piece couplings such that they form a tubular string or "pipe string" which is lowered into a wellbore.

The term "plated" can refer to metallic layers chemically bonded to the metallic material of the threaded one piece coupling usually with a thickness measured in microns, such as from 3 microns to 10 microns.

The term "preloaded connection" can refer to final connection of tubulars to which a specified torque has been applied to overcome the resistance at points of contact including the radial interference at the threads and seals combined with axial interference at the pin faces. A preloaded connection for the threaded one piece coupling has a tubular in compression and the body of the threaded one piece coupling in tension forming both radial and axial preload in the connection of tubulars and threaded one piece coupling.

The term "radial deflection" can refer to deformation of the threaded one piece coupling or tubular end in a radial direction towards or away from the central axis.

The term "radial depth" can refer to a feature of the threaded one piece coupling or tubular end that has a radial dimension, such as a relief groove or thread form.

The term "raked at an angle" can refer to small acute angles of the metal seal surface relative to the central axis forming an obtuse angle to the second metal seal surface of the threaded one piece coupling.

The term "relief groove" can refer to a groove adjacent to the threaded region or to a metal to metal seal surface that interrupts or separates the regions. For the threaded one piece coupling, the thread relief groove serves as a volume for excess thread lubricant.

The term "seal surface" can refer to a surface where fluid flow from high to low pressure regions is arrested by the threaded one piece coupling. Seal surfaces can be formed from metal to metal contact and can use resilient materials.

The term "semisolid lubricating coating" can refer to for convenience in application and use coatings that harden, which are commercially available and can be applied to the threaded one piece coupling. Examples of this coating can include fluoroelastomers based coatings based on PTFE.

The term "solid lubricating coating" can refer to a formulation of anti-friction materials that can be applied to the threaded one piece coupling's threads and seal regions or to the threads or seal regions of the tubular that will not fall or melt off during storage and handling before assembly into a string.

The term "swaged onto each tubular" can refer to a radial interfering threaded or metal to metal seal surface regions of the tubular which is created by applying torque to the tubular and rotating the tubular.

The term "tapered edge" can refer to a beveled or chamfered edge formed on the body; in the case of a cylindrical shape, a squared edge is tapered from a larger diameter to a smaller diameter.

The term "thread height" can refer to the thread form machined onto the outer surface of the tubular end and the inner surface of the threaded one piece coupling that has a radial dimension defined as the height.

The term "thread pitch" can refer to the threaded region of the threaded one piece coupling that is machined using a thread form along a helical path where each wrap of the thread form is closely fit next to the previous wrap forming a continuous helical thread where the axial distance between crests and grooves is defined as the pitch.

The term "thread thickness" can refer to a thread form machined onto the outer surface of the tubular end and the inner surface of the threaded one piece coupling that has an axial dimension defined as the thickness.

The term "threaded one piece coupling" can refer to a cylindrical shaped tube generally one to five diameters in length that has thread forms machined onto each end almost always on the inside surface. The threaded one piece couplings can be a metallic material. The threaded one piece coupling is machined from a single piece of steel or other metal.

The term "threaded region" can refer to the zone at the end of a tubular or at either end of the threaded one piece coupling where the thread form is machined.

The term "threaded relief groove" can refer to a groove adjacent to the threaded portion or threaded section or to a metal to metal seal surface that allows machine tools to complete the threaded forms.

The term "torque transfer" can refer to torque applied to each tubular during make-up with the threaded one piece coupling that is reacted by the radial interference at the threads and seals but when the pin faces meet, the torque is transferred from the tubular being torqued to the tubular already made-up into the threaded one piece coupling.

The term "tubular" can refer to a pipe or conduit generally circular in cross section of variable length in excess of 20 feet. In oil and gas wells typically used to create a barrier to retain pressurized fluid or to allow fluids to flow to or from the surface.

The term "viscous liquid lubricating coating" can refer to a liquid or emulsion generally of hydrocarbon or synthetic materials such as oil or grease with anti-friction solid additives that can be applied to the threaded one piece coupling.

The improved threaded connection uniquely provides bands of high contact pressure without localized peak levels, forming high quality continuous metal to metal seals.

A benefit of the invention is that by utilizing the existing industry standards for threaded and coupled pipe used for wellbore tubulars, the improved threaded connection can be reproduced easily on existing stock of piping.

Another benefit of the invention is that the improved threaded connection allows torque control for make-up as compared to existing threaded connections that use positional control for make-up. The improved threaded connection can cause the pin faces of the tubulars to meet initially at a small point of contact forming a metal to metal seal then deflect enabling the pin faces to absorb more torque forces than other commercially available connections applied during tubular make-up.

Yet another benefit of the invention is that through an efficient use of materials and low-cost connection methods, the improved threaded connection with threaded one piece coupling can provide a metal to metal seal that is typically only possible in premium-cost couplings.

The improved threaded connection with threaded one piece coupling is expected to reduce at least 10 percent of the leaks common with standard or commercially available tubular casing connections while allowing versatility with torque stops and pin face to pin face connections that do not require precision machining.

The improved threaded connection joins a first tubular with a first mating pin face to a second tubular with a second mating pin face for oil and gas field operation.

Embodiments can feature a triple seal redundancy with two metal seal positions and a thread compound seal, thereby providing additional safeguards against errors that can occur during manufacturing and installation. If one seal is defeated, the other two seals still hold.

In embodiments, the improved threaded connection can be 10 percent to 20 percent shorter than those found in existing industry standards, thereby conserving material and reducing waste.

In embodiments, the improved threaded connection as a pin face to pin face connection reduces material waste by eliminating the internal shoulder common in existing commercial connections.

The threaded one piece coupling of the invention can provide metal to metal seals without using material on the inner surface typically utilized in premium-cost one piece couplings with internal shoulders.

The embodiments can contain a pin profile that can be machined from an existing American Petroleum Institute (API) standard threaded pipe, or from surplus pipe stock thereby reducing manufacturing costs, generated waste, and overall energy footprints.

The threaded one piece coupling of the present invention can be used between standard API tubulars, or the threaded one piece coupling can be used as a cross-over between tubulars and standard API tubulars forming a casing string in a wellbore without having to special order or custom thread additional tubulars.

The threaded one piece coupling can be made from various types of metals including low alloy carbon steel, alloy steel, corrosion resistant alloys that include chromium, nickel, and combinations thereof.

In embodiments, the threaded one piece coupling can have a body thickness from 0.25 inches to 2 inches, a thread with a pitch from 0.125 inches to 0.5 inches, a thread thickness with a width from 0.05 inches to 0.5 inches, and a thread height from 0.02 inches to 0.25 inches.

In embodiments, the threaded one piece coupling has an anti-corrosion material on the outer surface of the threaded one piece coupling providing cathodic protection on a portion of the threaded one piece coupling.

In embodiments, the threaded one piece coupling has a lubricating coating disposed on each threaded region. The lubricating coating has at least one of: a lubricating powder, a solid lubricating coating, a viscous liquid lubricating coating, and a semisolid lubricating coating.

In embodiments, the threaded one piece coupling has a plating disposed on a portion of the threaded region. The plating can be of an alloy of zinc, an alloy of copper, a tin, or combinations thereof.

In embodiments, the threaded one piece coupling has a plating consisting of the alloy of copper a Cu—Zn—X1 alloy, wherein X1 is one or more elements selected from Sn, Bi, and In.

In embodiments, the threaded one piece coupling has a plating consisting of the alloy of copper a composition of: 20 percent to 70 percent copper, 2 percent to 25 percent zinc, and a third component of X1, wherein the total amount of X1 is from 22 percent to 64 percent.

In embodiments, the threaded one piece coupling has a phosphate coating disposed over the threaded one piece coupling, encapsulating the threaded one piece coupling, wherein the phosphate coating has a thickness from 1 mil to 2 mils.

The threaded one piece coupling can have first and the second relief grooves each relief grooves each having a depth from 100 percent to 150 percent of the height of the threads in the threaded regions.

In embodiments, for a 5.5 inch outer diameter pipe, the threaded one piece coupling can be 8.25 inches long, have an outer diameter of 6.25 inches, an overall body thickness of 0.54 inches, a thread thickness of 0.1 inches, and a thread height of 0.062 inches.

The threaded one piece coupling can be usable on piping with differing wall thicknesses, such as 3.5 inch outer diameter pipe, as well as pipes with outer diameters of 4 and ½ inches, 5 inches, 6 and ⅝ inches, 7 inches, 7 and ⅝ inches, 8 and ⅝ inches, 9 and ⅝ inches, 10 and ¾ inches, and 13 and ⅜ inches. The threaded one piece coupling can also be used on 20 inch diameter pipe.

In other embodiments, the threaded one piece coupling can be on any size pipe, such as 60 in diameter pipe, for major waste water municipal projects, like the transfer of fresh water from the Russian River in California to the City of San Francisco.

In embodiments, the threaded one piece coupling has a bearing face angle for each one piece coupling bearing face. Each bearing face angle is substantially perpendicular to the central axis of the threaded one piece coupling, and each threaded one piece coupling bearing face supports the weight of the connected tubulars of a pipe string.

In embodiments, the threaded one piece coupling has the first tapered edge is asymmetrical to the second tapered edge, and wherein each tapered edge extends from the outer surface of the threaded one piece coupling at an angle from 10 degrees to 40 degrees from the central axis of the threaded one piece coupling.

In embodiments, the threaded one piece coupling has a first lead in taper formed between the first threaded region and the first one piece coupling bearing face, and a second lead in taper formed between the second threaded region and the second one piece coupling bearing face.

In embodiments, the threaded one piece coupling has one of the torque stops disposed on a second flank of either a first or second threaded relief groove. The torque stop is formed at an angle from 75 to 105 degrees relative to the central axis.

In embodiments, the threaded one piece coupling has the first metal seal surface raked towards the second metal seal surface at an angle from −10 degrees to +10 degrees relative to the central axis of the threaded one piece coupling.

In embodiments, the threaded one piece coupling has a central deflection relief groove that is formed with a first sloped flank, a deflection groove inner surface, a second sloped flank, and the combination of the first sloped flank, the deflection groove inner surface and the second sloped flank enable radial deflection of the first and second axial mating pin faces when torque is applied to the first tubular and second tubulars.

In embodiments, the threaded one piece coupling with central deflection relief groove has a deflection radial depth between the first and second sloped flanks of no more than 30 percent of a threaded relief radial depth of the first and the second threaded relief grooves.

Turning now to the Figures, FIG. 1A depicts a cutaway view of the one piece coupling of the improved threaded connection.

The threaded one piece coupling 22 can be used to engage an end of a tubular known as a "pin".

The threaded one piece coupling 22 can have a body 23. The body 23 can have an inner surface 36 and an outer surface 24 formed around a central axis 14.

The inner surface 36 can have a first threaded region 38 and a second threaded region 42 formed on the inner surface of the threaded one piece coupling. The threaded regions can include threads 25.

Two bearing face angles 31*a* and 31*b* are shown.

Each bearing face angle can be for one of the threaded one piece coupling bearing faces (shown in FIGS. 1C and 1D).

Each bearing face has a bearing face angle that can be substantially perpendicular, such as at 90 degrees+/−10 degrees to the central axis 14, allowing each one piece coupling bearing face to support the connected tubulars.

In embodiments, the threaded one piece coupling 22 can have an anti-corrosion material 530 on the outer surface 24 providing cathodic protection disposed over a portion of the threaded one piece coupling. In embodiments, the anti-corrosion material can form a zinc anode.

Figure 1B:
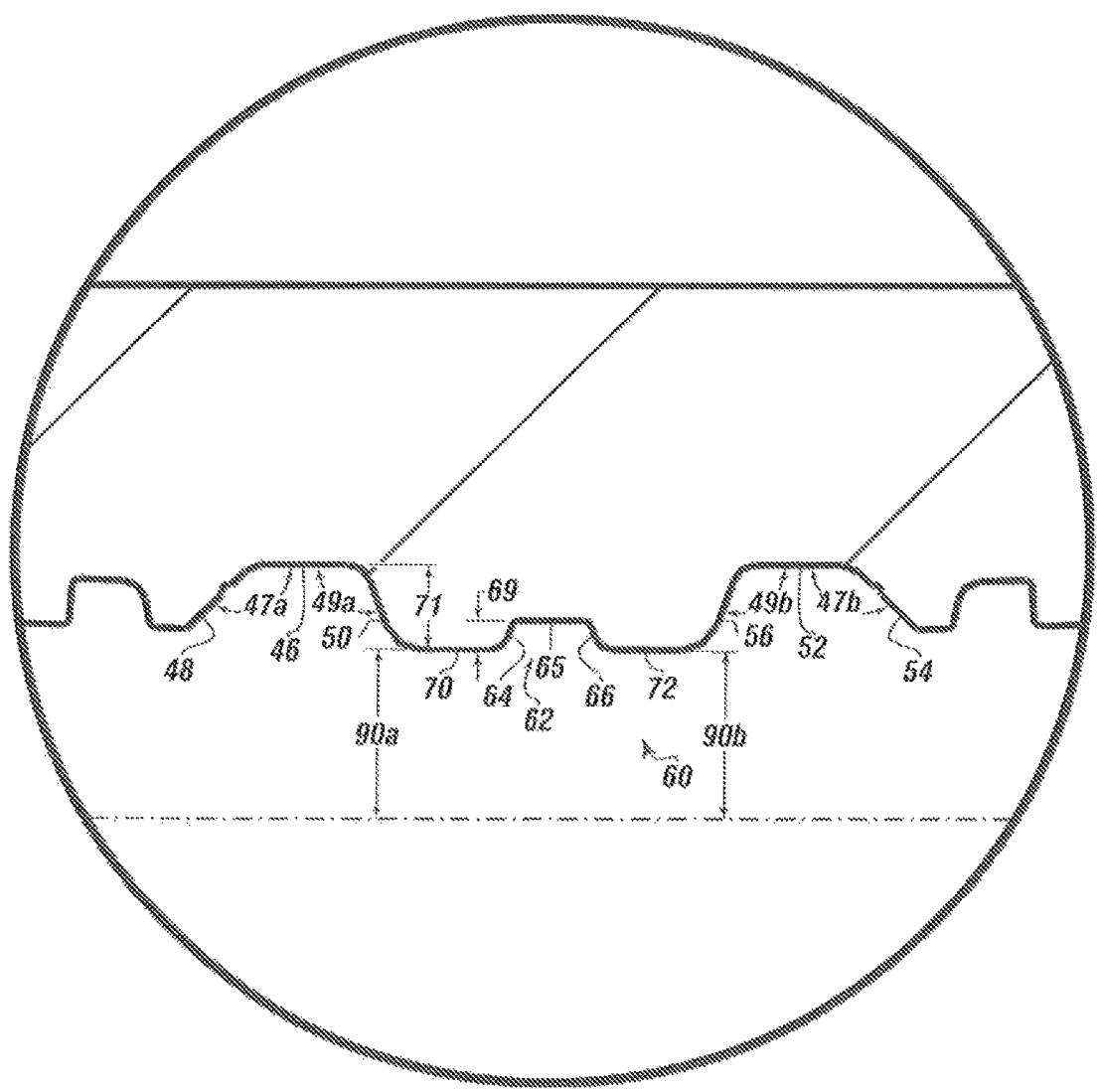
FIG. 1B depicts a detailed view of a metal to metal seal surface on the threaded one piece coupling.

FIG. 1B depicts a detailed view of a metal to metal seal surface on the threaded one piece coupling.

The improved threaded connection uses a threaded one piece coupling that has a metal to metal seal surface 60.

The metal to metal seal surface 60 can have a first metal seal surface 70 and a second metal seal surface 72.

The first metal seal surface 70 can be raked toward the second metal seal surface 72 at an angle from −10 degrees to +10 degrees relative to the central axis 14.

In this embodiment, the threaded one piece coupling can have a first threaded relief groove 46 with a first threaded relief groove first flank 48 with a first threaded relief groove first flank angle 47*a* that can be from 40 degrees to 50 degrees relative to the central axis 14.

The first threaded relief groove can have a first threaded relief groove second flank 50 extending at a first threaded relief groove second flank angle 49*a* that can be from 75 degrees to 105 degrees relative to the central axis 14.

The threaded one piece coupling can have a second threaded relief groove 52 with a second threaded relief groove first flank 54 extending at a second threaded relief groove first flank angle 47*b* that can be from 40 degrees to 50 degrees relative to the central axis 14.

The second threaded relief groove can have a second threaded relief groove second flank 56 extending at a second threaded relief groove second flank angle 49*b* that can be from 75 degrees to 105 degrees relative to the central axis 14.

The threaded one piece coupling can have a central deflection relief groove 62 formed between a first sloped flank 64 and second sloped flank 66.

The central deflection relief groove 62 can have a first sloped flank 64, a deflection groove inner surface 65, and a second sloped flank 66.

The second metal seal surface 72 is on an opposite side of the central deflection relief groove 62.

The combination of the first sloped flank, deflection groove inner surface and second sloped flank can allow radial deflection of the first and second mating pin faces (shown in FIG. 2) when torque is applied from the tubulars onto the threaded one piece coupling of the improved threaded connection.

The central deflection relief groove 62 can have a deflection radial depth 69 between the first and second sloped flanks of no more than 30 percent of the threaded relief radial depth 71 of the first and the second threaded relief grooves.

The first and the second metal seal surfaces 70 and 72 can each be raked at an angle from −10 degrees to +10 degrees relative to the central axis.

Elements 90*a* and 90*b* depict the angle of the metal seal surfaces 70 and 72 from −10 degrees to +10 degrees relative to the central axis.

The first metal seal surface and the second metal seal surface can be formed on each side of the central deflection relief groove.

The central deflection relief groove can have surfaces allowing for radial pin face deflection due to the applied torque of a preloaded connection.

The radial depth of the central deflection relief groove formed as the sloped flanks meet the inner surface of the central deflection relief groove can be up to 30 percent the radial depth of the first and the second threaded relief grooves.

As the threaded one piece coupling is swaged onto each pin of each tubular, the one piece coupling can deflect away from the central axis, providing bands of uniform high contact pressure to ensure the metal to metal seal surfaces hold fluid pressures equivalent to the burst pressure of the tubulars. High contact pressure can range from 10,000 psi to 300,000 psi.

FIG. 1C depicts a detailed view of a first end of the threaded one piece coupling of FIG. 1A.

The threaded one piece coupling can have a first tapered edge 28 extending from the outer surface having a first angle 29*a* that can be from 10 degrees to 40 degrees from the central axis. The slope of the first tapered edge 28 can be oriented towards one of the tubulars.

The threaded one piece coupling can have a first one piece coupling bearing face 32 formed on the first tapered edge at a substantially perpendicular angle, such as a 90 degree angle+/−10 degrees from the central axis 14.

The threaded one piece coupling can have a first lead in taper 40 formed on the inner surface.

In embodiments, the one piece coupling can have a phosphate coating 536 disposed over the threaded one piece coupling, encapsulating the threaded one piece coupling. The phosphate coating can have a thickness from 1 mil to 2 mils.

Additionally, a lubricating coating 532 can be disposed on the threads of the threaded one piece coupling. The lubricating coating can be at least one of: a lubricating powder, a solid lubricating coating, a viscous liquid lubricating coating, and a semisolid lubricating coating.

FIG. 1D depicts a detailed view of a second end of the threaded one piece coupling of FIG. 1A.

The threaded one piece coupling can have a second tapered edge 30 extending from the outer surface.

The second tapered edge 30 can have a second angle 29*b* extending from the outer surface from 10 degrees to 40 degrees from the central axis. The slope of the first tapered edge 30 can be oriented, or raked, toward one of the tubulars.

In embodiments, the second tapered edge can be symmetrical to the first tapered edge.

In embodiments, a first tapered edge can be formed asymmetrical to a second tapered edge and each tapered edge can extend from the outer surface at angles 29a and 29b respectively, with each angle being at a different degree. Each angle can vary from 10 degrees to 40 degrees from the central axis 14.

The threaded one piece coupling can have a second one piece coupling bearing face 34 formed on the second tapered edge at a substantially perpendicular angle, such as a 90 degree angle+/−10 degrees to the central axis.

A second lead in taper 44 can be formed on the inner surface between the second threaded region and the second one piece coupling bearing face In embodiments, a plating 534 can be disposed on a portion of the threads of the threaded one piece coupling. In embodiments, the plating is at least one of an alloy of zinc, an alloy of copper, and a tin.

FIG. 2 depicts a cutaway view of two tubulars usable to form the improved threaded connection.

The first tubular 10a on the left of the Figure, can be made up of a first tubular threaded region 11a, a first radial surface 21a, and a first mating pin face 18a.

The first tubular is depicted with first tubular central axis 114.

The second tubular 10b can be made up of a second tubular threaded region 11b, second radial surface 21b, and a second mating pin face 18b.

The second tubular is depicted with second tubular central axis 115.

The first mating pin face 18a be formed at an angle from 80 degrees to 90 degrees from the central axis 114.

The second mating pin face 18b can each be formed substantially traverse to the central axis 115 and at an angle from 80 degrees to 90 degrees from the central axis 115.

The first radial surface 21a can be formed between the first mating pin face 18a and the first tubular threaded region 11a. The first radial surface 21a can be substantially longitudinal with the central axis 114. The first radial surface 21a can be formed at an angle from −10 degrees to +10 degrees from the central axis 114.

The second radial surface 21b can be formed between the second mating pin face 18b and the second tubular threaded region 11b. The second radial surface 21b can be substantially longitudinal with the central axis 115. The second radial surface 21b can be formed at an angle from −10 degrees to +10 degrees from the central axis 115.

Each mating pin face can absorb torque from the tubular threaded regions creating one or more bands of high contact pressure.

FIG. 3 is a cutaway view of the improved threaded connection 7 with the two pin ends of the two tubulars 10a and 10b joined by the threaded one piece coupling 22.

The tubulars 10a and 10b can have mating pin faces mated inside the threaded one piece coupling, forming multiple metal to metal seals between the joined threads creating connected tubulars.

The threaded one piece coupling 22 can be swaged onto the tubulars 10a and 10b.

A first metal to metal seal 500 can be formed between the first metal seal surface and the first radial surface.

A second metal to metal seal 502 can be formed between the second metal seal surface and the second radial surface.

The first and the second metal seal surfaces can be raked towards each other relative to the central axis 14.

As the inner surface of the body of the threaded one piece coupling is swaged onto each tubular, the inner surface deflects away from the central axis, providing bands of high contact pressure 510a, 510b, and 510c for each metal to metal seal between the inner surface of the body and each connected tubular to sustain seal pressures between the threaded one piece coupling and each tubular that is equivalent to or greater than the burst pressure of the tubular.

FIG. 4 is a detail of the improved threaded connection 7.

In FIG. 4, the threaded one piece coupling 22 for joining a first tubular 10a and second tubular 10b engages a first pin 630 and a second pin 632.

The threaded one piece coupling has a central deflection relief groove, a first metal seal surface on one side of the central deflection relief groove; and a first coupling minimal radial shoulder 600 adjacent the first metal seal surface.

The minimal radial shoulder 600 extends an angle from 75 degrees to 105 degrees from a central axis of the threaded one piece coupling.

In embodiments, a first threaded relief groove is positioned adjacent the minimal radial shoulder 600.

A first threaded relief groove flank is adjacent the first metal seal surface.

The first threaded relief groove flank extends at an angle from 75 degrees to 105 degrees relative to the central axis of the threaded one piece coupling.

The first pin 630 can have a first axial mating pin face with a first radial metal seal surface for engaging a first metal seal surface on the threaded one piece coupling. The first metal seal surface can be adjacent to the first axial mating pin face.

A first pin minimal radial shoulder 700 can be adjacent the first radial metal seal surface. The first pin minimal radial shoulder 700 can extend at an angle from 75 degrees to 105 degrees from a central axis of the threaded one piece coupling.

A second coupling minimal radial shoulder 610 is adjacent the second metal seal surface. The second one piece coupling minimal radial shoulder can extend an angle from 75 degrees to 105 degrees from the central axis of the threaded one piece coupling.

A second threaded relief groove is positioned adjacent the second one piece coupling minimal radial shoulder 610.

The second pin 632 has a second axial mating pin face and a second radial metal seal surface for engaging a second metal seal surface on the threaded one piece coupling. The second metal seal surface can be adjacent to the second axial mating pin face.

A second pin minimal radial shoulder 710 can be adjacent the second metal seal surface. The second pin minimal radial shoulder can extend an angle 75 degrees to 105 degrees from a central axis of the threaded one piece coupling.

The first tubular 10a with a first pin 630 has a first axial mating pin face 18a and a first axial metal seal surface 820 on the first axial mating pin face.

The second tubular 10b with a second pin 632 has a second axial mating pin face 18b and a second axial metal seal surface 822 on the second axial mating pin face.

FIG. 5 depicts a detailed view of the threaded one piece coupling for use in the improved threaded connection 7.

In embodiments, the central deflection relief groove of the threaded one piece coupling with a first sloped flank 64 having a deflection groove inner surface 65 can enable radial deflection of the first and second axial mating pin faces when torque is applied to the first tubular and second tubular.

A first threaded relief groove 46 can have a first metal seal surface 70 for forming a first metal to metal seal when the first tubular threaded region 11a engages the first threaded region of the threaded one piece coupling. In embodiments, the first metal seal surface 70 have continuous curvature of a radius or can be flat.

The first torque stop 809 between the first metal seal surface 70 and the first threaded relief groove 46 is shown.

A first pin 630 can have a minimal radial shoulder 700 adjacent the first radial metal seal surface 21a.

The first threaded relief groove second flank extending at a first threaded relief groove second flank angle 49a from 75 degrees to 105 degrees relative to the central axis forming a first torque stop 809 between the first metal seal surface 70 and the first threaded relief groove 46.

FIG. 6 presents a detailed view of the threaded one piece coupling for use in the improved threaded connection.

In embodiments, the central deflection relief groove of the threaded one piece coupling with a second sloped flank 66 having a deflection groove inner surface 65 can enable radial deflection of the first and second axial mating pin faces when torque is applied to the first tubular and second tubular.

A second threaded region 11b with a second threaded relief groove 52 is shown having a second metal seal surface 72 for forming a second metal to metal seal when the second tubular threaded region 11b engages the second threaded region of the threaded one piece coupling. In embodiments, the second metal seal surface 72 can have continuous curvature of a radius or can be flat.

The second torque stop 810 between the second metal seal surface 72 and the second threaded relief groove 52.

The second pin 632 has a minimal radial shoulder 710 adjacent a second radial metal seal surface 21b.

The second threaded relief groove second flank 56 can extend at a second threaded relief groove second flank angle 49b relative to the central axis 14 forming a second torque stop 810 between the second metal seal surface 72 and the second threaded relief groove 52.

While these embodiments have been described with emphasis on the embodiments, it should be understood that within the scope of the appended claims, the embodiments might be practiced other than as specifically described herein.

What is claimed is:

1. An improved threaded connection of a first tubular with a second tubular, wherein the improved threaded connection comprises:
   a. a first tubular with a first pin, the first pin comprises:
      (i) a first axial mating pin face;
      (ii) a first axial metal seal surface on the first axial mating pin face;
      (iii) a first radial metal seal surface adjacent to the first axial mating pin face;
      (iv) a first pin minimal radial shoulder adjacent the first radial metal seal surface; the first pin minimal radial shoulder extending at an angle 75 degrees to 105 degrees from a first tubular central axis of the first tubular;
      (v) a first tubular threaded region formed adjacent the first pin minimal radial shoulder for forming a first threaded engagement;
   b. a second tubular with a second pin, wherein the second pin comprises:
      (i) a second axial mating pin face;
      (ii) a second axial metal seal surface on the second axial mating pin face;
      (iii) a second radial metal seal surface adjacent to the second axial mating pin face;
      (iv) a second pin minimal radial shoulder adjacent the second radial metal seal surface; the second pin minimal radial shoulder extending at an angle 75 degrees to 105 degrees from a second tubular central axis of the second tubular;
      (v) a second tubular threaded region formed adjacent the second pin minimal radial shoulder for forming a second threaded engagement; and
   c. a threaded one piece coupling for mating the first pin of the first tubular with the second pin of the second tubular, comprising: an outer surface, an inner surface and a central axis;
      (i) the outer surface comprising: a first tapered edge extending from the outer surface; a second tapered edge extending from the outer surface opposite the first tapered edge; a first coupling bearing face formed on the first tapered edge for supporting load, weight, or both load and weight and weight of the connected tubulars; a second coupling bearing face formed on the second tapered edge for supporting load, weight, or both load and weight and weight of the connected tubulars;
      (ii) an inner surface comprises:
         a first threaded region with a first threaded relief groove having a first metal seal surface for forming a first metal to metal seal when the first tubular threaded region engages the first threaded region;
         a first threaded relief groove first flank extending at a first threaded relief groove first flank angle relative to the central axis;
         a first threaded relief groove second flank extending at a first threaded relief groove second flank angle relative to the central axis forming a first torque stop between the first metal seal surface and the first threaded relief groove;
         a second threaded region with a second threaded relief groove having a second metal seal surface for forming a second metal to metal seal when the second tubular threaded region engages the second threaded region;
         a second threaded relief groove first flank extending at a second threaded relief groove first flank angle relative to the central axis;
         a second threaded relief groove second flank extending at a second threaded relief groove second flank angle relative to the central axis forming a second torque stop between the second metal seal surface and the second threaded relief groove;
         a central deflection relief groove positioned between the first metal seal surface and the second metal seal surface; and wherein the first axial metal seal surface engages the second axial metal seal surface; and
         wherein the threaded one piece coupling is configured to either (i) provide the first torque stop using the first tubular while simultaneously providing an axial metal seal between connected pin faces of the first and second tubulars without forming a second torque stop with the second tubular, or (ii) provide the second torque stop using the second tubular while simultaneously providing an axial metal seal between connected pin faces of the first and second tubulars without forming the first torque stop with the first tubular; and wherein the inner surface of the threaded one piece coupling deflects away from the central axis, providing a plurality of radial bands of high contact pressure and an axial band of high contact pressure for each connected tubular to sustain seal pressures between the threaded one piece coupling and each tubular that are equivalent to or greater than the burst pressures of each tubular.

2. The improved threaded connection of claim 1, wherein the first tapered edge has a first angle, the second tapered edge has a second angle, and each angle extends from 10 degrees to 40 degrees from the central axis of the threaded one piece coupling.

3. The improved threaded connection of claim 1, comprising a bearing face angle for each one piece coupling bearing face, wherein each bearing face angle is substantially perpendicular to the central axis of the threaded one piece coupling, and each one piece coupling bearing face supports the connected first and second tubulars.

4. The improved threaded connection of claim 1, wherein the first tapered edge is asymmetrical to the second tapered edge, and wherein each tapered edge extends from the outer surface of the threaded one piece coupling at an angle from 10 degrees to 40 degrees from the central axis of the threaded one piece coupling.

5. The improved threaded connection of claim 1, comprising a first lead in taper formed between the first threaded region and the first one piece coupling bearing face, and a second lead in taper formed between the second threaded region and the second one piece coupling bearing face.

6. The improved threaded connection of claim 1, wherein one of the torque stops is disposed on a second flank of either a first or second threaded relief groove, and the torque stop is formed at an angle from 75 to 105 degrees relative to the central axis.

7. The improved threaded connection of claim 6, wherein each torque stop is disposed on a second flank of the first or second threaded relief groove respectively, and each torque stop is formed at an angle from 75 to 105 degrees relative to the central axis.

8. The improved threaded connection of claim 1, wherein the first metal seal surface is raked towards the second metal seal surface at an angle from −10 degrees to +10 degrees relative to the central axis of the threaded one piece coupling.

9. The improved threaded connection of claim 1, wherein the central deflection relief groove comprises: a first sloped flank, a deflection groove inner surface, and a second sloped flank, and the combination of the first sloped flank, the deflection groove inner surface and the second sloped flank enabling radial deflection of the first and second axial mating pin faces when torque is applied to the first tubular and second tubulars.

10. The improved threaded connection of claim 9, wherein the central deflection relief groove has a deflection radial depth between the first sloped flank and second sloped flank of no more than 30 percent of a threaded relief radial depth of the first threaded relief groove and the second threaded relief groove.

11. The improved threaded connection of claim 1, wherein the threaded one piece coupling has a body thickness from 0.25 inches to 2 inches.

12. The improved threaded connection of claim 1, wherein each threaded region comprises:
 a. threads with a pitch from 0.125 inches to 0.5 inches;
 b. threads with a thread thickness with a width from 0.05 inches to 0.5 inches; and
 c. threads with a thread height from 0.02 inches to 0.25 inches.

13. The improved threaded connection of claim 12, comprising an anti-corrosion material on the outer surface of the threaded one piece coupling providing cathodic protection on a portion of the threaded one piece coupling.

14. The improved threaded connection of claim 12, comprising a lubricating coating disposed on each threaded region, wherein the lubricating coating comprises at least one of: a lubricating powder, a solid lubricating coating, a viscous liquid lubricating coating, and a semisolid lubricating coating.

15. The improved threaded connection of claim 12, comprising a plating disposed on a portion of the threaded region, wherein the plating comprises: an alloy of zinc, an alloy of copper, a tin, or combinations thereof.

16. The improved threaded connection of claim 15, wherein the alloy of copper is a Cu—Zn—X1 alloy, wherein X1 is one or more elements selected from Sn, Bi, and In.

17. The improved threaded connection of claim 16, wherein the alloy of copper has a composition of: 20 percent to 70 percent copper, 2 percent to 25 percent zinc, and a third component of X1 wherein the total amount of X1 is from 22 percent to 64 percent.

18. The improved threaded connection of claim 1, comprising a phosphate coating disposed over the threaded one piece coupling, encapsulating the threaded one piece coupling, wherein the phosphate coating has a thickness from 1 mil to 2 mils.

19. The improved threaded connection of claim 1, wherein the first and second relief grooves each have a depth from 100 percent to 150 percent of the height of the threads in the threaded regions.

* * * * *